United States Patent [19]

Canfora

[11] Patent Number: 4,636,226
[45] Date of Patent: Jan. 13, 1987

[54] HIGH PRESSURE OXYGEN PRODUCTION SYSTEM

[75] Inventor: Philip H. Canfora, Norton, Ohio

[73] Assignee: VBM Corporation, Louisville, Ky.

[21] Appl. No.: 769,479

[22] Filed: Aug. 26, 1985

[51] Int. Cl.⁴ ............................................. B01D 53/04
[52] U.S. Cl. ........................................ 55/68; 55/75; 55/179; 55/389
[58] Field of Search ...................... 55/23–26, 55/31, 33, 35, 58, 59, 62, 68, 74, 75, 161–163, 179, 180, 303, 316, 387, 389; 138/30, 31

[56] References Cited

U.S. PATENT DOCUMENTS

| | | | |
|---|---|---|---|
| 2,316,251 | 4/1943 | Kahle et al. | 55/33 X |
| 2,828,769 | 4/1958 | Cooper | 138/30 |
| 3,075,558 | 1/1963 | Forell | 138/30 |
| 3,486,297 | 12/1969 | Eisinga et al. | 55/25 X |
| 3,487,855 | 1/1970 | Lautenberger, Jr. | 138/31 |
| 3,659,399 | 5/1972 | Kauer et al. | 55/33 |
| 3,720,042 | 3/1973 | Simonet | 55/25 |
| 3,804,125 | 4/1974 | Sonneman | 138/30 |
| 3,923,477 | 12/1975 | Armond et al. | 55/25 |
| 4,013,429 | 3/1977 | Sircar et al. | 55/33 |
| 4,021,210 | 5/1977 | Streich et al. | 55/26 |
| 4,194,890 | 3/1980 | McCombs et al. | 55/25 X |
| 4,229,188 | 10/1980 | Intille | 55/62 X |
| 4,238,204 | 12/1980 | Perry | 55/62 X |
| 4,264,340 | 4/1981 | Sircar et al. | 55/25 |
| 4,329,158 | 5/1982 | Sircar | 55/26 |
| 4,348,213 | 9/1982 | Armond | 55/25 |
| 4,409,102 | 10/1983 | Tanner | 55/33 X |
| 4,552,571 | 11/1985 | Dechene | 55/25 X |

Primary Examiner—Robert Spitzer
Attorney, Agent, or Firm—Fay, Sharpe, Fagan, Minnich & McKee

[57] ABSTRACT

A cross-over valve (24) alternately supplies compressed air from a source of compressed air (A) to a pair of beds (26, 28) filled with a molecular sieve material. An oxygen rich gas component separated from the compressed air by the molecular sieve beds is channeled to a separated gas reservoir (C). To use the oxygen in the reservoir, the compressed air is directed against a barrier, such as bellows (52), located within the separated gas reservoir to compress the oxygen rich gas component held therein. The oxygen rich gas component is then supplied at this elevated pressure to welding or other downstream equipment. In this manner, the oxygen separator may operate sixteen hours to provide a supply of oxygen for an eight hour shift. The oxygen is supplied to the downstream equipment at a higher pressure which is increased over and above the supply pressure from the oxygen separation device.

18 Claims, 6 Drawing Figures

HIGH PRESSURE OXYGEN PRODUCTION SYSTEM

BACKGROUND OF THE INVENTION

The present invention relates to the art of gas separation. It finds particular application in the separation of oxygen from atmospheric air for supply to welding or other downstream equipment at relatively high pressures. It is to be appreciated, however, that the application is also applicable to systems for separating and supplying one or more selected gases, e.g. separating nitrogen from air, membrane separation, hydrolysis, peroxide reduction, or the like.

Heretofore, oxygen separation equipment commonly included a compressor for supplying atmospheric air at a superatmospheric pressure. A crossover valve alternately channeled the atmospheric air to one of a pair of beds filled with a physical separation medium. As one bed passed the oxygen component and retained the other components of atmospheric air, a fraction of the separated oxygen was fed back to the other bed flushing the retained components to rejuvenate the other bed. The pressurized atmospheric air was alternately supplied to each bed as the other bed was rejuvenated to maintain a continuing supply of oxygen or oxygen-rich gas.

Such oxygen separators have been used in automotive garages and other industrial applications to supply oxygen for welding and other industrial equipment. One drawback of the prior arts system resided in sizing the system for the shop. The oxygen separation system needed to be sized to the peak oxygen demand rate, i.e. the system was oversized for non-peak demand periods. The oversizing increased the purchase cost, operating costs, and maintenance costs.

It was difficult to select the size of a system properly for a shop switching from bottled oxygen. Many shop owners could calculate the daily oxygen volume requirements from the number of oxygen tanks purchased. However, such shops rarely had the data from which to calculate the peak oxygen usage rate.

Moreover, even an oversized oxygen separator supplied oxygen or oxygen-rich gas at a relatively low pressure, normally below 60 psi, i.e. many times less than the 2200 psi pressure of bottled oxygen. This relatively low oxygen pressure created a lazy welding flame with little momentum. Although the low momentum flames were adequate for cutting and welding lighter gauges of sheet steel, heavier steel plates and castings required a higher momentum flame.

In accordance with the present invention, a new and improved gas separation system is provided which overcomes the above referenced problems and others.

SUMMARY OF THE INVENTION

In accordance with a first aspect of the present invention, an apparatus is provided for supplying a selected gaseous component. A gas supply means supplies the selected gaseous component, such as oxygen separated from a gaseous mixture or an oxygen bearing composition. The gas supply means discharges the gaseous component at a first, relatively low pressure to a gas reservoir. A pressure increasing means increases the pressure of the gaseous component within the gas reservoir to a second, relatively high pressure. More particular to the preferred embodiment, the pressure increasing means may include a bladder, piston, or the like for compressing the gaseous component under motive force from compressed air into a fraction of the volume of the gas reservoir.

In accordance with another aspect of the present invention, a system is provided for supplying a selected gaseous component. A gas distribution means distributes a pressurized gaseous mixture between at least two beds of a physical separation medium which separates at least one gaseous component from the mixture. A reservoir receives the separated gaseous component from the beds. A pressure increasing means receives motive force from the source of the pressurized gaseous mixture to increase the pressure of the separated gaseous component in the reservoir. In the preferred embodiment, the system separates oxygen from compressed air received from an existing compressed air supply system, which separated oxygen is compressed by the compressed air.

In accordance with yet another aspect of the present invention, a method of supplying a selected gaseous component is provided. The selected gaseous component is supplied to a gaseous component receiving reservoir. The pressure of the gaseous component in the reservoir is increased. In the preferred embodiment, the gaseous component pressure increasing step is achieved by alternately filling the reservoir with the gaseous component and decreasing the volume in the reservoir.

One advantage of the present invention is that it increases the pressure at which oxygen or other selected gaseous components may be supplied.

Another advantage of the present invention is that it increases the total volume of oxygen separated while reducing the size of the oxygen separation system. The present invention meets relatively high peak demands which exceed the instantaneous production rate of the system. For example, in a shop which only operates eight hours a day, oxygen is manufactured during sixteen off hours. Allowing sixteen hours to produce eight hours worth of oxygen, of course, can meet the volume and peak oxygen demands with a relatively small system.

Yet another advantage of the present invention is that it increases separation efficiency. First, the present invention provides a relatively low back pressure from the reservoir in which the separated component is accumulated. Second, the present invention enables existing and already operating air compression systems to supply air to the separator. Third, operating the system for sixteen hours to supply eight hours worth of oxygen enables the system to run at a relatively low pressure, hence high separation efficiency.

Still further advantages of the present invention will become apparent upon reading and understanding the following detailed description of the preferred embodiments.

BRIEF DESCRIPTION OF THE DRAWINGS

The invention may take form in various parts and arrangements of parts or in various steps and arrangements of steps. The drawings are only for purposes of illustrating preferred embodiments and are not to be construed as limiting of the invention.

DETAILED DESCRIPTION OF THE PREFERRED EMBODIMENTS

Figure 1:
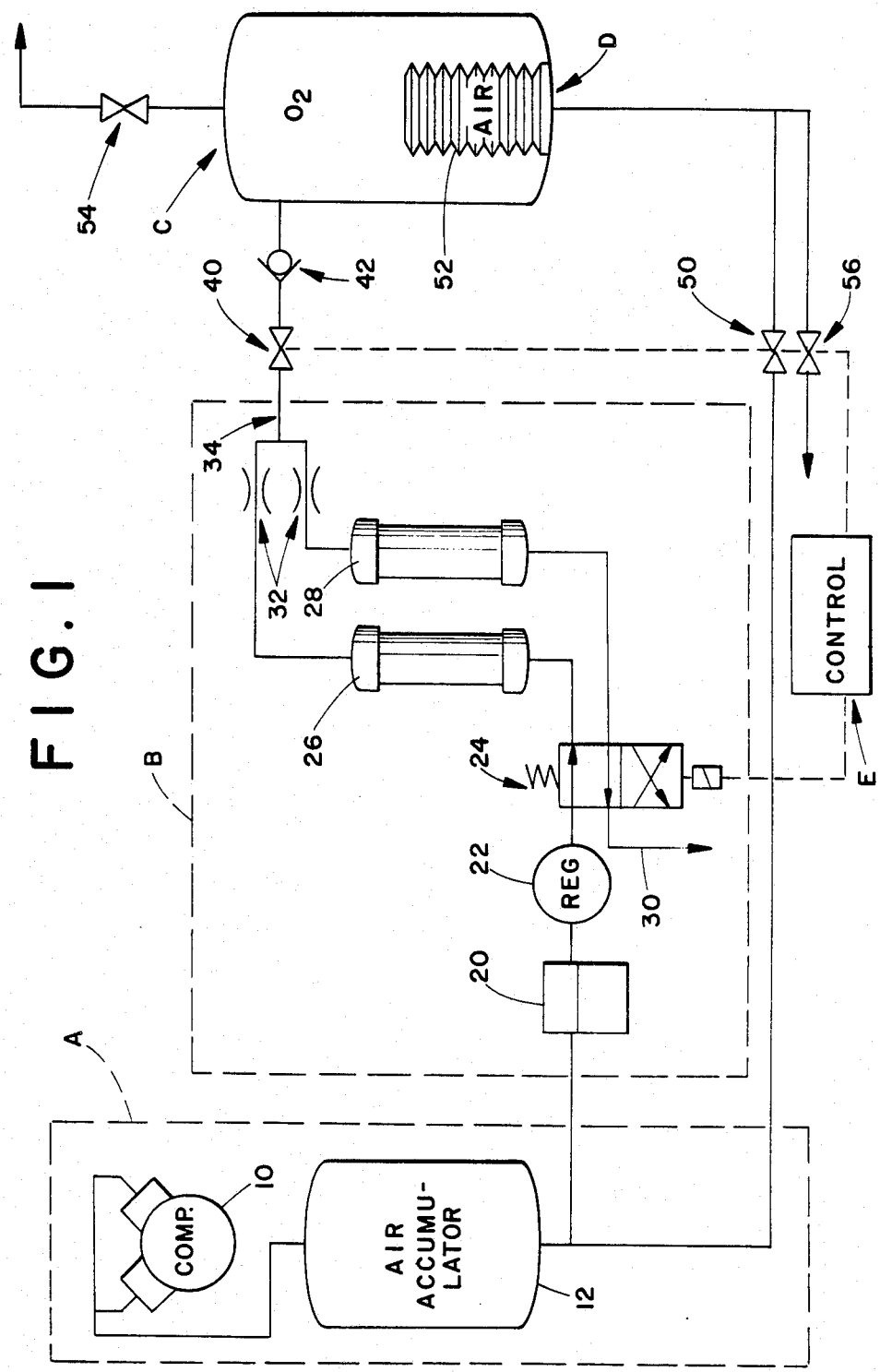
FIG. 1 is a diagramatic illustration of a gaseous component separation and supply system in accordance with the present invention.
Figure 2:
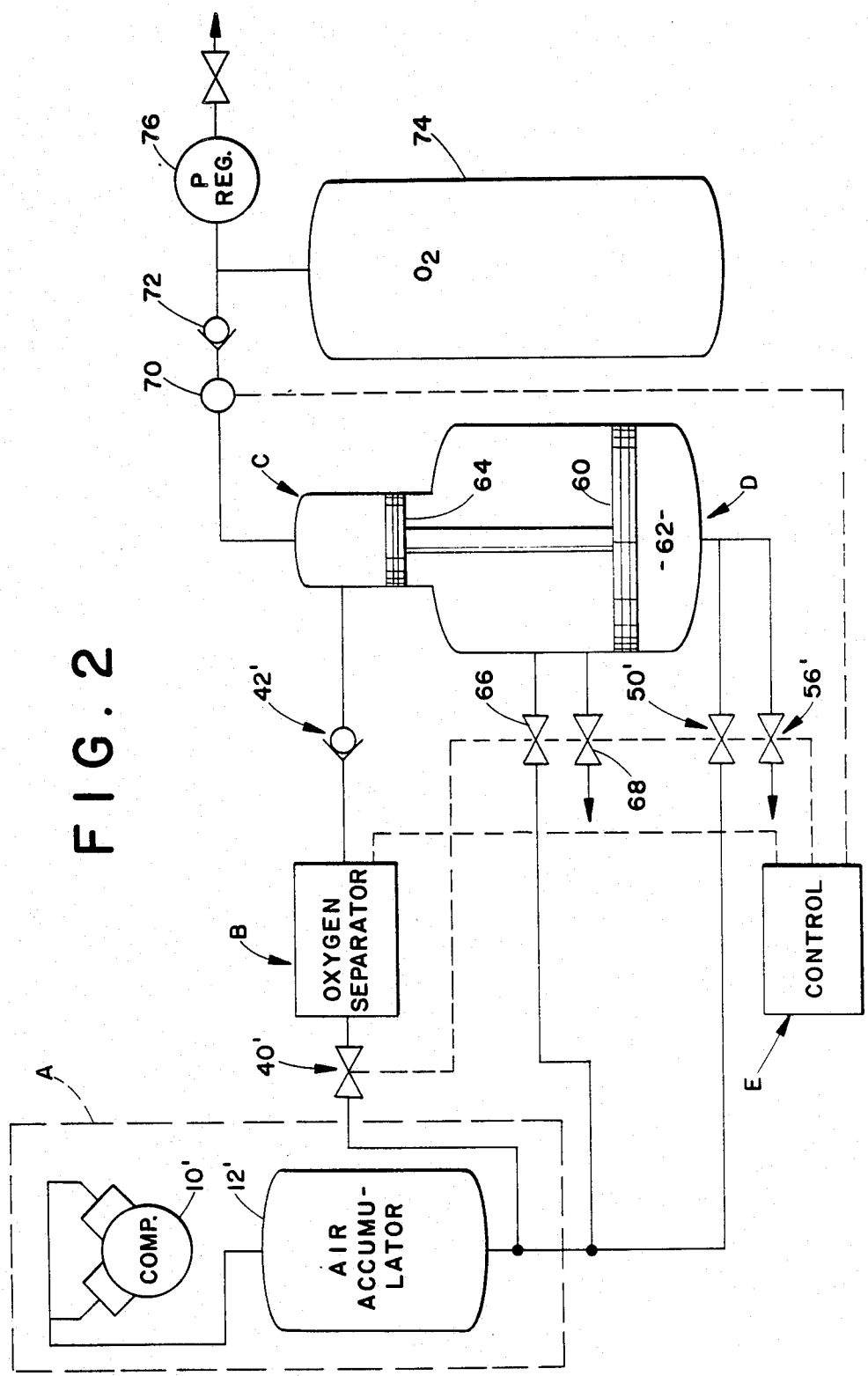
FIG. 2 is alternate embodiment of the gas separation and supply system of FIG. 1.

With reference to FIGS. 1 and 2, a compressed gaseous mixture supply source A provides a supply of compressed air or other gaseous mixture. A gas supply or separating means B separates a preselected component from the gaseous mixture or from a chemical composition. In the preferred embodiment, the gas separation means separates oxygen from the atmospheric air. Optionally, nitrogen may be separated from air or other component(s) may be separated from other mixtures. As other options, the gaseous component may be supplied by membrane separation, separation or release of oxygen from peroxide, separation of other selected gas from compounds or mixtures thereof, separation of oxygen from water by hydrolysis, or the like. A reservoir C receives the separated oxygen or other gaseous component from the gas separating means. A pressure increasing means D selectively reduces the pressure in the reservoir during filling and increases the pressure of the oxygen or other separated gaseous component for discharge. A control means E controls the operation of the gas separation means and the pressure increasing means.

With reference to FIG. 1, the compressed gaseous mixture supply means A includes a compressor 10 which supplies a compressed gas, particularly air, to an accumulator vessel 12. Commonly, a shop compressed air supply system includes a pressure sensor in conjunction with the air accumulator to operate the compressor in such a manner that a preselected air pressure is maintained in the accumulator, e.g. 100 psi. Such compressed air supply systems are commonly found in shops to supply compressed air to run pneumatic equipment and the like.

The gas separation means B includes a received gas conditioning means 20, such as a filter for removing oil, water vapor, and other contaminants. A pressure regulator 22 may conveniently regulate the pressure of the received compressed air. A cross over valve means 24 selectively connects the received pressurized air with one of a pair of molecular sieve beds 26, 28. The cross over valve means also connects the other of the molecular sieve beds with a nitrogen or waste gas vent 30. The molecular sieve beds are filled with a physical separation medium which permits oxygen to pass therethrough while adsorbing nitrogen, carbon dioxde, and other physically larger molecules. Restricters 32 permit a fraction of the separated oxygen to be fed back into the physical separation bed which is interconnected with the nitrogen vent 30. The fed back oxygen backwashes or flushes nitrogen, carbon dioxide, and other adsorbed molecules from the bed rejuvenating it. The remainder of the oxygen passes to an oxygen or primary product outlet 34. In this manner, the compressed air or gas mixture supply means A provides atmospheric air or other gaseous mixtures at appropriate pressures to operate the gas separating means B without additional compressor stages.

The separated oxygen or primary product gas is conveyed through a control valve 40 and a check valve 42 to the separated gas reservoir C in which the separated component accumulates. Because the oxygen flow is increased as the back pressure from the reservoir is decreased, the reservoir is sized such that the gas pressure therein remains low during an oxygen separation cycle. A typical oxygen separation cycle for a shop which works only eight hours a day, might be the remaining sixteen hours of the day.

At the end of the gas separation portion of the cycle, the primary product gas supply valve 40 is closed and a pressure increasing gas supply valve 50 is opened. The supply valve 50 supplying pressurized air or gas from the pressurized gas source A to the pressure increasing means D to provide motive power thereto. In the embodiment of FIG. 1, the pressure increasing means includes a bladder or bellows 52 which is inflated with the compressed air. Inflating the bladder compresses the oxygen or other separated gaseous component within the separated gas reservoir C, increasing its pressure.

A primary product supply valve 54 selectively supplies the separated component to welding and other downstream equipment. By maintaining the compressed gas supply valve 50 open as the separated component is withdrawn from the reservoir, the bladder 52 continues to expand maintaining the pressure of the separated component substantially constant. After the separated component has been discharged from the reservoir, the pressurized gas supply valve 50 is closed. The primary product valve 40 and a compressed air vent valve 56 are opened. As additional oxygen is supplied to the reservoir, air is drained from the bladder or bellows through the vent valve 56 to the atmosphere.

In the embodiment of FIG. 2, like components with the embodiment of FIG. 1 are denoted by the same reference numeral but followed by a prime ('). The pressurized gas supply source A includes a compressor 10' which feeds compressed air to an air accumulator 12'. The gas separating means B receives compressed air through a control valve 40' and separates the oxygen and the nitrogen therefrom. The primary product outlet supplies oxygen or nitrogen, as may be appropriate to the intended application, through a check valve 42' to the separated gas receiving reservoir C.

The pressure increasing means D includes a force or pressure multiplying means. A first piston 60 is slidably mounted in a compressed air receiving or pressurizing chamber 62. A second or compressing piston 64 is connected with the first piston 60 to be advanced and withdrawn therewith. The second piston 64 is several times smaller than the first piston 60 such that the pressure is multiplied by several times the pressure of the compressed air from the air accumulator 12'. For example, if the surface area of the first piston 60 is ten times the surface area of the second piston 64 and compressed air is supplied from the air accumulator 12' at one 100 psi, the separated component or oxygen at 1000 psi would be discharged from the separated gas reservoir. Optionally, if no multiplication of the pressure is required, a single piston may divide the separated component and compressed air chambers. Analogously, a pressure divider may be created when the first piston is of a larger cross section of area than the second piston.

Optionally, a second compressed air supply valve 66 may be connected with the pressurizing chamber 62 on the opposite side from the first piston 60 to urge the first piston downward drawing a vacuum or otherwise decreasing the pressure in the separated gas reservoir C. In this manner, the pressurized air may be utilized to reduce the pressure at the primary product outlet of the gas separating means B. A vent valve 68 enables air on the other side of the first piston to be vented as the separated component is compressed.

When a pressure sensor 70 senses that the pressure of the oxygen or other separated component in the separated gas reservoir has reached a preselected pressure, the control means E is caused to close the primary product gas control valve 40' and open the pressurizing gas control valve 50' forcing the separated component to be pumped through a check valve 72 to a separated component accumulator 74. A pressure regulator 76 regulates the pressure at which the accumulated separated component is supplied to downstream equipment.

In this manner, the gas separation means B may separate the primary product gas from the gaseous mixture substantially continuously. Whenever, the separated gas reservoir C becomes full or reaches a preselected pressure, the gas separating step is temporarily halted as the separated component is pumped at a relatively high pressure into the separated component or oxygen accumulator. Thereafter, the separation of the primary product gas from the gaseous mixture is recommenced.

Figure 3:
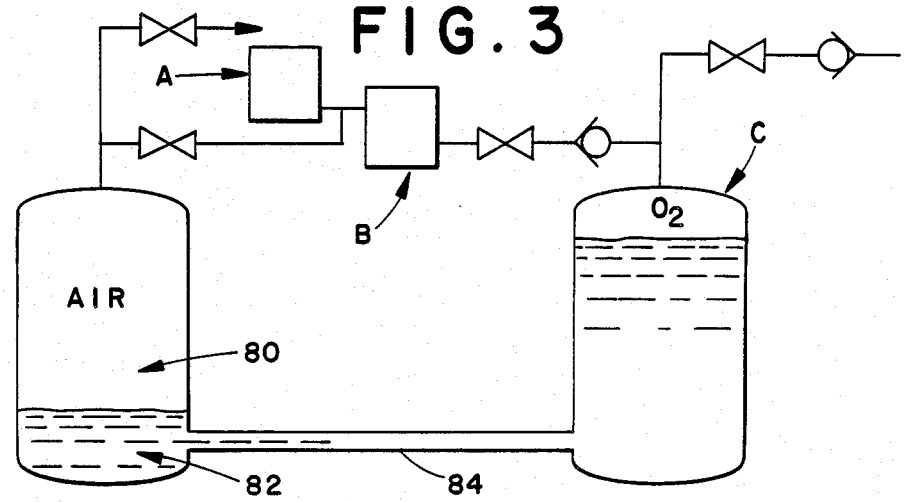
FIG. 3 is an alternate embodiment of the pressure increasing structure of FIG. 1 or 2 for increasing the pressure of the separated gaseous component.

With reference to FIG. 3, the separated gas reservoir C is separated from a compressed air receiving chamber 80 by a movable fluid or liquid barrier 82. In particular, the compressed air receiving chamber 80 and the separated reservoir C are side by side. The chambers are interconnected at their base by a fluid passage 84. The fluid, such as oil or water, is selectively pumped from the compressed air receiving chamber 80 to the oxygen or separated gas receiving reservoir C to pressurize the separated gaseous component therein.

Figure 4:
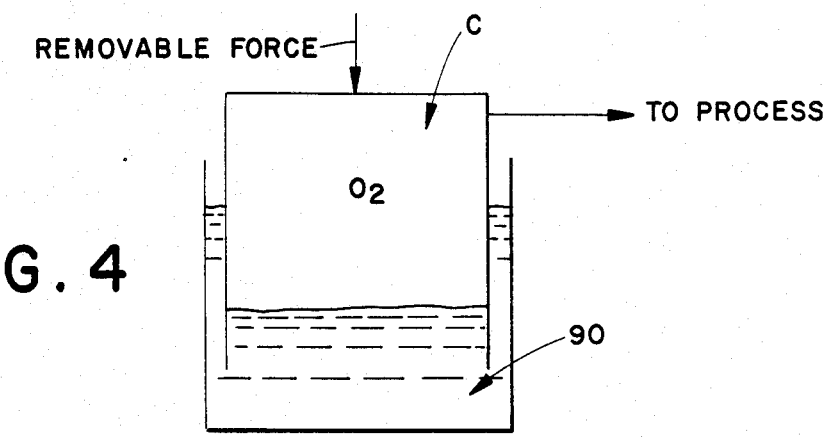
FIG. 4 is another alternate embodiment of the separated gaseous component pressure increasing system.

With reference to FIG. 4, the separated gas receiving reservoir C is defined by an open bottomed tank which is received in a liquid filled reservoir 90. A selectively removable force, such as pressure from a pneumatic cylinder, selectively urges the open bottomed tank downward into the fluid reservoir 90 pressurizing the oxygen or other separated component received therein.

Figure 5:
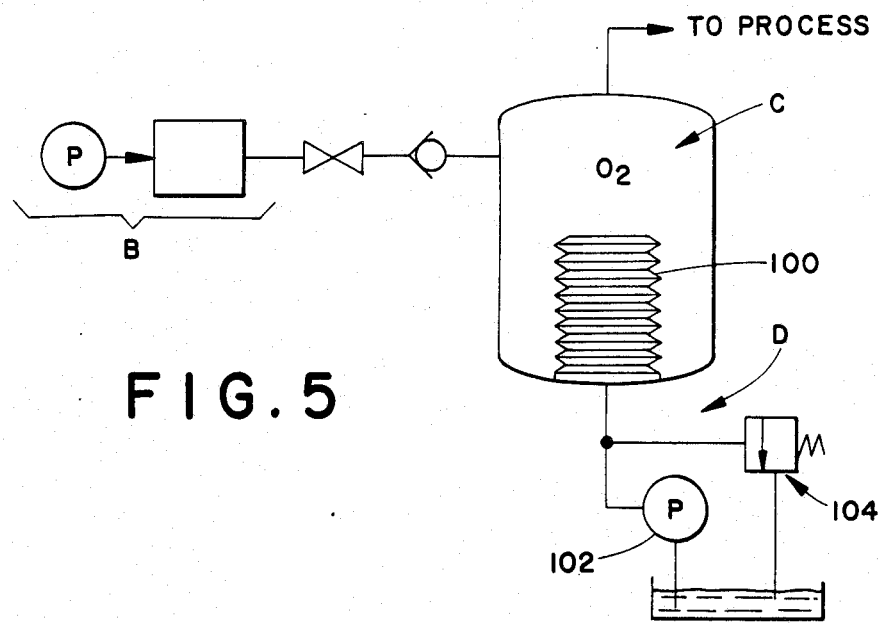
FIG. 5 is yet another alternate embodiment of the separated gaseous component pressure increasing system; and, FIG. 6 is still another alternate embodiment of the present invention.

With reference to FIG. 5, the gas separation means B may include its own compressor rather than relying on the compressor of the compressed air source of the shop. The separated gas receiving reservoir C receives a separated component from the gas separation means B. The pressurizing means D includes a bladder or bellows 100 into which fluid is selectively pumped by a pump 102. A fluid pressure regulator 104 maintains the pressure of the fluid within the bladder substantially constant at a preselected level.

Figure 6:
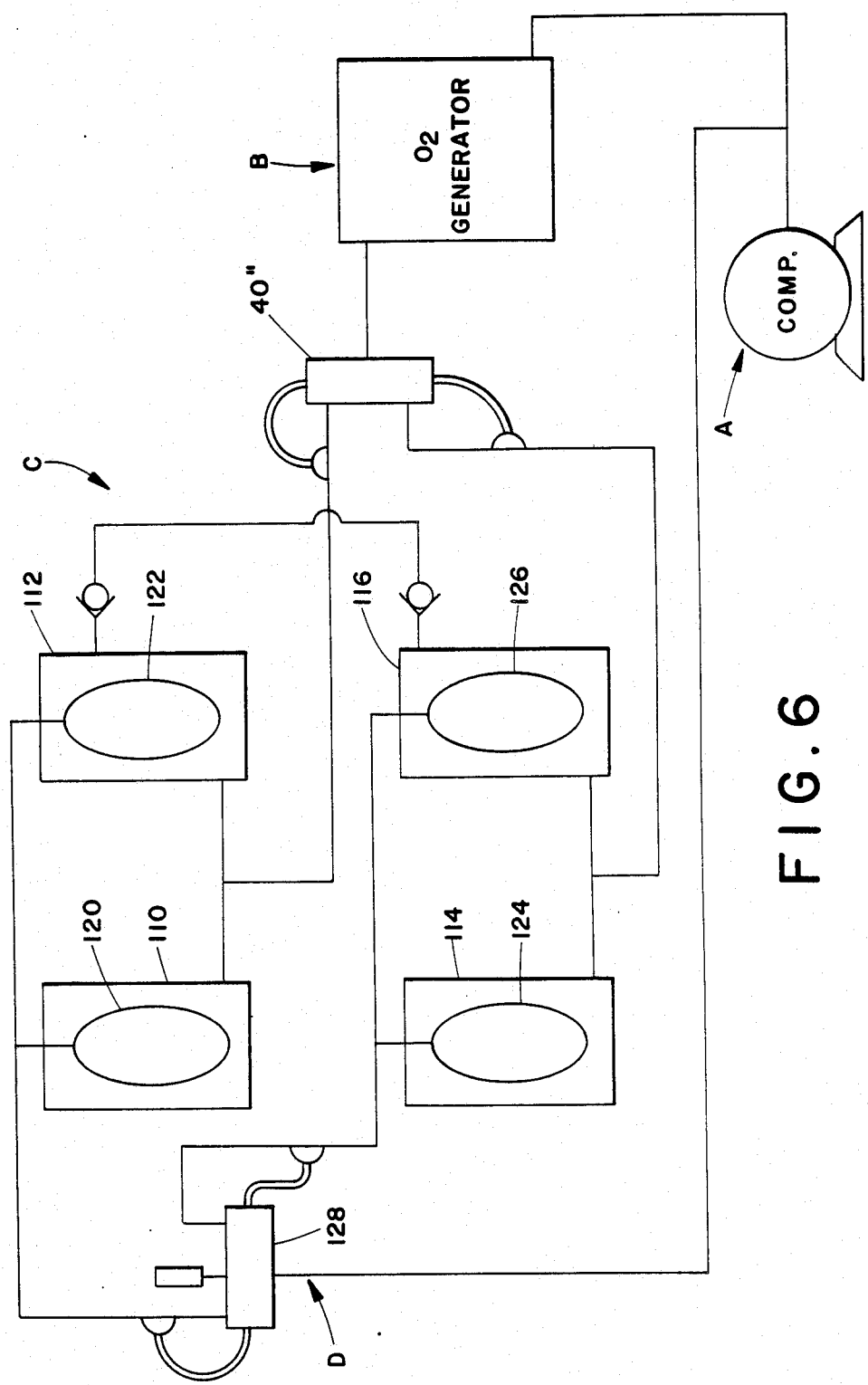

With reference to FIG. 6, the gas receiving reservoir C includes a plurality of banks of chambers or tanks 110, 112, 114, and 116. Each tank has an expansible chamber or bladder 120, 122, 124, and 126, respectively, disposed therein for selectively decreasing and increasing its effective size. In the preferred embodiment, there are two banks each with two tanks. However, three or more banks may be provided, each bank including one or more discrete or multiple chambered tanks. The pressure increasing means D includes a valve 128 which provides pressure to the expansible chambers of the high pressure or oxygen supplying tanks and vents the expansible chambers of the low pressure or oxygen receiving tanks. A control valve 40" selectively channels the oxygen from the oxygen generator B to the tanks which are at the low pressure. Concurrently, high pressure oxygen is conveyed from the high pressure tanks to downstream equipment. The valves 40" and 128 cycle periodically such that each bank alternately receives oxygen as low pressure and discharges it downstream at high pressure.

The invention has been described with reference to the preferred embodiments. Obviously, modifications and alterations will occur to others upon reading and understanding the preceding specification. It is intended that the invention be construed as including all such alterations and modifications in so far as they come within the scope of the appended claims or the equivalents thereof.

Having thus described preferred embodiments, the invention is now claimed to be:

1. A method of supplying a selected gaseous component at a first relatively high pressure, the method comprising:
   supplying a gaseous mixture at a second, relatively high pressure;
   separating the selected gaseous component from the mixture and supplying the separated, selected gaseous component to a separated gas reservoir at a first, relatively low pressure;
   after receiving the selected gaseous component in the reservoir, contracting the effective volume of the gaseous reservoir under motive force supplied by the gaseous mixture such that the pressure of the selected gaseous component is increased to the first relatively high pressure;
   removing the motive force of the gaseous mixture allowing the effective volume of the gaseous reservoir to expand and the pressure of the gaseous component therein to decrease such that additional selected gaseous component at the first, relatively low pressure is received therein;
   cyclically repeating the effective volume contracting and expanding steps such that the pressure of the selected gaseous component is cyclically increased to the first relatively high pressure.

2. The method as set forth in claim 1 further including passing the selected gaseous component at the first relatively high pressure from the separated gas reservoir into an accumulator during the effective volume decreasing step and blocking the selected gaseous component from flowing from the accumulator back into the separated gas reservoir during the effective volume expanding step.

3. The method as set forth in claim 1 wherein the gaseous mixture is air and the selected gaseous component is oxygen.

4. The method as set forth in claim 3 wherein the effective volume contracting step includes inflating an expansion chamber within the separated gas reservoir with the compressed air.

5. The method as set forth in claim 1 wherein the effective volume contracting step includes utilizing the gaseous mixture to move a physical separation barrier to contract the effective volume of the separated gas reservoir.

6. An apparatus for supplying a selected gaseous component, the apparatus comprising:
   a compressor means for supplying a gaseous mixture at a relatively high pressure;
   a gas separating means for selectively separating at least one preselected gaseous component from the gaseous mixture, the gas separating means being operatively connected with the compressor means for receiving the gaseous mixture therefrom at the relatively high pressure and having a separated gas outlet through which the separated gaseous component is supplied at a relatively low pressure; and, a pressure increasing means for increasing the pressure of a separated gaseous component to a pressure which is higher than said relatively low pressure, the pressure increasing means being operatively connected with the compressor means to receive motive power from the relatively high pressure gaseous mixture received therefrom and being operatively connected with the gas separating means to receive the separated gaseous component and increase the pressure thereof above the relatively low pressure.

7. The apparatus as set forth in claim 6 wherein the pressure increasing means includes:

a separated gas reservoir for receiving the separated gaseous components from the gas separating means;

an expansible chamber disposed within the separated gas reservoir, an interior of the expansible chamber being isolated from the interior of the separated gas reservoir, and operatively connected with the compressor means for selectively receiving the gaseous mixture at the relatively high pressure to increase a volume of the expansible chamber and decrease a volume of the separated gas reservoir available for receipt of the separated gaseous component such that the pressure of the received, separated gaseous component is increased above the relatively low pressure by the selective increasing in the volume of the expansible chamber under the motive force of the relatively high pressure gaseous mixture from the compressor means.

8. The apparatus as set forth in claim 7 wherein the expansible chamber includes a flexible bladder.

9. The apparatus as set forth in claim 7 wherein the expansible chamber includes a movable barrier which is operatively disposed between the separated gaseous component received from the separating means at the relatively low pressure and the gaseous mixture received from the compressor means at a relatively high pressure.

10. The apparatus as set forth in claim 9 wherein the movable barrier includes a piston slidably mounted in the separated gas reservoir.

11. The apparatus as set forth in claim 7 wherein the pressure increasing means further includes a pressure multiplier means for multiplying the force exerted by the gaseous mixture such that the pressure of the separated gaseous component within the separated gas reservoir is increased to a pressure which is greater than the relatively high pressure of the gaseous mixture from the compressor means.

12. A gaseous component supplying apparatus for supplying a selected gaseous component at a relatively high pressure, the apparatus comprising:

a gas separating means for separating and supplying a preselected gaseous component at a relatively low pressure;

a separated gas reservoir for receiving the preselected gaseous component, the separated gas reservoir being operatively connected with the gas separating means;

an effective volume means for selectively contracting an effective volume of the separated gas reservoir available to receive the preselected gaseous component therein; and, a control means for cyclically disconnecting and connecting the effective volume means with a source of fluid at a relatively high pressure such that (i) when the effective volume means is connected with the relatively high pressure fluid source, the effective volume of the separated gas reservoir is contracted under motive force from the relatively high pressure fluid compressing the gaseous component received therein and (ii) when the effective volume means is disconnected from the relatively high pressure fluid source, the effective volume of the separated gas reservoir is permitted to expand to facilitate the receipt of the preselected gaseous component therein at the relatively low pressure, whereby the preselected gaseous component is cyclically received at the relatively low pressure and compressed to a higher pressure.

13. The apparatus as set forth in claim 12 wherein the source of fluid under pressure is a compressor means for supplying a gaseous mixture at the relatively high pressure, the compressor means being operatively connected both with the effective volume means to provide motive power thereto and with the gas separating means to supply the gaseous mixture thereto from whch the gas separating means separates the preselected gaseous component.

14. The apparatus as set forth in claim 13 wherein the gas separating means includes a gas distribution means for distributing the gaseous mixture between at least two beds of a physical separation medium which separate at least the preselected gaseous component from the mixture, the gas distribution means being connectable with the compressor means.

15. The appartus as set forth in claim 12 wherein the effective volume means includes a bladder which is selectively inflated with the relatively high pressure fluid.

16. The apparatus as set forth in claim 12 wherein the effective volume means includes a piston which is slidably mounted in the separated gas reservoir and which is selectively urged by the relatively high pressure fluid to compress the preselected gaseous component.

17. The apparatus as set forth in claim 12 wherein the effective volume means includes a liquid which is selectively urged into the separated gas reservoir.

18. The apparatus as set forth in claim 12 wherein the effective volume means includes a pressure multiplier for multiplying the pressure of the relatively high pressure fluid such that the preselected gaseous component is compressed to a pressure which is higher than the relatively high pressure.

* * * * *